Patented Aug. 24, 1943

2,327,972

UNITED STATES PATENT OFFICE 2,327,972

HIGH STRENGTH CERAMIC SURFACE

Kenneth E. Stettinius and Benjamin F. Dewey, Le Roy, N. Y., assignors to Lapp Insulator Company, Inc., Le Roy, N. Y., a corporation of New York No Drawing. Application January 17, 1939, Serial No. 251,394

12 Claims. (Cl. 117—16)

A ceramic surface of such nature that it will increase the strength of the ceramic body to which it is applied, is much to be desired. One of the main objects of the present invention is to provide a ceramic body having a rough ceramic surface of high strength.

A roughened surface on a ceramic article is of advantage under many conditions, as for example to form a better bond between the ceramic article and a layer of cement or a layer of metal applied thereto. But roughened ceramic surfaces heretofore have usually made the article weaker than it would have been if the roughness were not present.

Another object of the invention is to provide a roughened ceramic surface which is better and more satisfactory and of greater strength than those heretofore available, and which can be produced easily and inexpensively.

To these and other ends the invention resides in certain improvements, all as will be hereinafter more fully described, the novel features being pointed out in the claims at the end of the specification.

The roughened surface commonly used heretofore in the ceramic art is made up of what is known in the trade as "sand," formed of broken up or crushed pieces of ceramic material (e. g., porcelain) of the same or substantially the same composition as that of the ceramic body to which it is to be applied. Usually the ceramic body is coated with glaze, and the "sand" particles are applied to the glaze, or to the desired portion thereof, and then the article is fired in the kiln, which fuses the glaze and firmly attaches the "sand" particles to the main ceramic body, forming a roughened surface on the ceramic body or the desired part thereof.

It is known in the art that the strength of a ceramic body is increased by the use of a glaze having a coefficient of thermal expansion which is less than that of the ceramic body itself. Unfortunately, however, the use of a roughened surface obtained by "sand" particles of the above mentioned kind commonly employed, results in a marked decrease in the strength of the completed article. For example, a piece of unglazed electrical porcelain may have a modulus of transverse rupture of about 10,500 lbs. per square inch. When this same piece of porcelain is glazed with a glaze of known type commonly used, having a lower coefficient of thermal expansion than that of the porcelain, the strength of the article is increased, and under favorable conditions may be nearly doubled. But when the article thus glazed is "sanded" to produce a roughened surface, with porcelain "sand" of the same composition as that of the main body (this being the common practice), the modulus of transverse rupture drops again to approximately 11,000 to 11,500 lbs. per square inch. Thus, according to the prior practice, the advantage of increased strength obtained by using a low expansion glaze (sometimes called a compression glaze) is very largely lost or cancelled by the attempt to produce a roughened surface on the ceramic article, by following the procedure commonly employed heretofore.

According to the present invention, a much stronger ceramic article with a roughened surface can be produced. Broadly, the present invention accomplishes this by using roughness particles or "sand" which are of a material having a coefficient of thermal expansion less than that of the main ceramic body to which the "sand" is applied, instead of following the prior practice of making the "sand" of the same composition as the main ceramic body. Various inorganic materials or mixtures having when fired a lower coefficient of expansion than that of the main body may be employed, within the scope of the present invention. The preferred material is cordierite, or at least a material containing a substantial quantity of cordierite, although this may not be entirely cordierite. Good results have been obtained by using, as the roughness elements, a "sand" in which about one-third or one-quarter of the material in each grain has been converted to cordierite, the rest being of other material.

It is within the scope of the invention to apply the roughness elements to the glazed body initially in the form of cordierite, or to apply them initially in the form of other substances which, during the subsequent firing operation, will be wholly or partly transformed into cordierite.

When it is desired to use cordierite initially, naturally occurring cordierite may be employed, although sometimes it does not give good results and better results are usually obtained by employing a synthetic or artificial cordierite sand. In general, any mixture containing substantial amounts of clay and talc will produce some cordierite upon firing. It is usually preferable to employ a mixture containing clay, silica in some form (such as flint), and a magnesium compound (such as magnesium oxide or carbonate, talc, or other magnesium silicates). An advantage of the synthetic or artificial cordierite over the naturally occurring substance, is that by controlling the proportions of the ingredients, the amount of cordierite produced can be controlled, and thus there is some measure of control of the coefficient of thermal expansion of the "sand" or roughness particles used in forming the roughened surface, by controlling the proportion of cordierite to other materials in the sand mixture. It is desirable to control these factors so that the coefficient of expansion of the roughening mixture will be somewhat below that of the porcelain body to which it is applied, but not excessively far below, as that might cause the rough surface layer to shiver or flake off of a main porcelain body as a result of temperature changes. The proportions of the ingredients are, therefore, not fixed, but are a proper subject of laboratory control, depending somewhat on the composition and the resultant coefficient of expansion of the ceramic body on which the roughness is to be formed. In practically all ordinary porcelains used in the electrical industry, this coefficient of expansion is greater than that of cordierite, so that the present invention is applicable.

For example, one kind of feldspathic porcelain commonly used for making electric insulators and similar articles has a coefficient of thermal expansion of about 0.0000023 per degree Fahrenheit and for use on such a porcelain, the composition of the roughness elements should be so controlled as to provide a coefficient of expansion in the range of approximately 0.0000016 to 0.0000022, being preferably about 0.0000019. When the coefficient of expansion of the main body is higher or lower than that in the above example, the composition of the roughness elements is controlled to give a coefficient correspondingly different from that of the main body. For normally encountered temperature changes, it is usually satisfactory to make the expansion coefficient of the roughness elements from 0.0000001 to 0.0000007 less than that of the main body, the preferred difference being about 0.0000004, as in the above example.

Merely for the sake of a convenient example and not as a limitation, one mixture which is suitable under many circumstances for forming a roughened surface according to the present invention, may be made by using the following named materials in approximately the following percentages by weight:

|                       | Per cent |
|-----------------------|----------|
| Ball clay             | 17       |
| China clay or kaolin  | 26       |
| Flint                 | 30       |
| Talc                  | 19       |
| Feldspar              | 8        |

If a less vitreous mixture is desired, the percentages of the first four ingredients named may be increased and the amount of feldspar may be reduced or even entirely eliminated.

This mixture is formed in any suitable way into small pellets or particles, as for example by drying, crushing, and screening, or by turning ribbons from a chunk of this material in the green state, then crushing and screening these ribbons. The pellets or particles are preferably fired after being dried, and a multiplicity of such particles are applied to the wet glaze on the ceramic article whose surface is to be roughened. Other glaze may be added (by spraying or otherwise) over the roughness particles if desired, depending on the degree of roughness wanted in the finished article. Then the article is fired in the kiln in the usual way, at the usual temperatures employed in prior practice in making "sanded" surface ceramic articles. During the firing operation the mixture composing the roughness particles forms cordierite, at least in part, to a sufficient extent to reduce the coefficient of thermal expansion of the roughness grains below that of the main body, resulting in greatly increased strength of the finished ceramic body.

The proportions of the mixture may be varied as desired, as above explained, depending on the coefficient of expansion desired in the product. The use of flint, as in the above example, is beneficial because the flint tends to reduce or counteract the amount by which the coefficient of expansion is lowered for any given amount of talc. If no flint is used, smaller amounts of talc should be employed, and care should be taken not to get too much talc and produce a roughness layer having a coefficient of expansion too far below that of the main ceramic body, as this might cause the roughness layer to shiver. The use of feldspar promotes fusion or vitrification in the roughness mixture.

Another highly satisfactory material for making roughness elements of lower coefficient of expansion than the main ceramic body, is beryl porcelain, that is, a porcelain fluxed mainly with beryl rather than feldspar. Satisfactory mixtures may be made, for example, of approximately the following percentages by weight:

|           | Per cent  |
|-----------|-----------|
| Clay      | 30 to 50  |
| Beryl     | 65 to 40  |
| Feldspar  | 5 to 10   |

The above percentages are not limitations, but only an example, and wide variations in composition may be made, other ingredients being added if desired. The feldspar may be greatly reduced, or entirely omitted. Variation in coefficient of thermal expansion is obtained by using more or less of the beryl, and by this means the coefficient of expansion may be made of the desired relation to that of the main ceramic body on which this material is to be used.

This beryl porcelain is formed into grains or pellets and employed to make roughness elements in the same manner as above described in connection with the cordierite material.

Another way in which a roughened surface of the desired lower coefficient of expansion may be formed, for use on a main body of feldspathic porcelain of the kind above mentioned, is to apply to the desired areas of the porcelain body a glaze containing a magnesium compound, such as magnesium oxide, in which glaze is mixed powdered mullite. Then over the glaze, while it is still wet, are sprinkled roughness elements or particles of mullite of the desired size. Mullite is largely aluminum oxide and silicon dioxide. The article is then fired in the kiln, and after firing it is found that the rough surface layer has a coefficient of thermal expansion in the range above mentioned, somewhat less than that of the main body, so that the roughened surface layer is under compression and increased strength is obtained thereby.

The exact scientific explanation of how this lowered coefficient of expansion is obtained is not yet ascertained. But since mullite itself has a coefficient of expansion somewhat higher than that of a ceramic body of the kind indicated, it seems probable that during the firing, the magnesium compound in the glaze reacts with the mullite grains and with the mullite powder mixed in the glaze, to form some cordierite or an analogous material having the desired lower coefficient of expansion.

Particles of crushed fused quartz can also be employed as roughness elements to make a "sanded" surface of lower coefficient of expansion than the main body, but this is not suitable on a main ceramic body of ordinary feldspathic porcelain of the kind above mentioned, for there is too great a difference in the coefficients of expansion and the fused quartz roughness elements would shiver or flake off of the main body. But if the main ceramic body be made of material having a very low coefficient of expansion (such as a main body made of or containing a major proportion of cordierite or special beryl porcelains having very low thermal expansions) then the crushed fused quartz serves admirably to form roughness elements for use on such a main body, and provides a rough surface layer having a coefficient of expansion which is the desired amount less than that of such a main body.

If it is desired to increase the strength of the body without using glaze, this may be done according to the present invention by making a "slip" of the same composition above suggested for making the roughness elements, and coating the ceramic body with this slip to form what is frequently called an engobe, and then firing. There are many instances in which it is desired to provide ceramic bodies with unglazed surfaces; for example, certain ceramic articles for use in the chemical industry are preferred in an unglazed condition. So far as known, it has heretofore been impossible to secure an increase in strength of unglazed ceramic articles by means of a coating, but this can readily be accomplished according to the present invention. If an unglazed rough coating is desired, then roughness elements made in the manner above set forth may be applied to a slip or engobe coating on the ceramic body, or may be mixed with the slip and applied in mixed form, so that the slip or engobe, when hardened by firing, serves to hold the roughness elements to the ceramic body without the necessity of using glaze.

It is within the scope of this invention to use roughness elements of lower coefficient of expansion than the body, as above described, in connection with a slip or engobe coating which is not necessarily of the same composition as the roughness elements and which may, on the contrary, be of a composition having approximately the same coefficient of expansion as the main body. But it is the preferred practice, in order to obtain maximum strength, to attach these roughness elements to the main ceramic body by means of a coating which, like the roughness elements themselves, is of lower coefficient of expansion than the body.

The invention is not limited to cordierite, mullite, beryl porcelain, quartz, or other materials specifically mentioned herein as examples. Also the invention is not limited to any particular kind or shape of ceramic article, or to any particular use for the roughened surface, as the invention may be advantageously employed wherever it is desired to have a ceramic article with a rough unglazed surface, or with a rough glazed surface, and also to have increased strength compared to what the strength would be if the surface were made according to the prior art. For instance, the roughened surface of the present invention may be used as an attaching surface to receive a coating of metal, cement, or plastic substance, or it may be used in the chemical industry (on chemical tower fillings or elsewhere) to retard or impede the flow of fluids over the roughened surface or to increase the effective area of the surface.

The size of the "sand" particles or roughness elements may be varied, but usually it is most satisfactory to use a mixture of grains varying from about 18 to 30 mesh.

Usually only one firing operation is required, for firing both the main ceramic body and the smooth or rough coating. But whenever preferred, the main ceramic body may be previously fired, and the coating may be treated by a second or subsequent firing operation.

It is to be noted that the low expansion materials of the present invention are used as a surface coating on all or any desired part of the surface of a previously formed porcelain body having a higher coefficient of expansion than such surface coating, and are not mixed throughout the body, which would undesirably tend to lower the coefficient of expansion of the whole body and tend to lessen the desired contrast between the expansion characteristics of the body and the expansion characteristics of the surface layer or coating.

While certain embodiments of the invention have been disclosed, it is to be understood that the inventive idea may be carried out in a number of ways. This application is therefore not to be limited to the precise details described, but is intended to cover all variations and modifications thereof falling within the spirit of the invention or the scope of the appended claims.

We claim:

1. A porcelain body having a portion of its surface coated with an added ceramic coating, and a multiplicity of particles of ceramic material contained in said coating and held thereby to said body with portions of said particles projecting above said coating to provide a roughened surface, said coating and said particles after firing having coefficients of thermal expansion lower than that of said body.

2. A porcelain body having a portion of its surface coated with a slip, and a multiplicity of particles of ceramic material contained in said slip and held thereby to said body to provide a roughened surface, said slip and said particles after firing having coefficients of thermal expansion lower than that of said porcelain body.

3. A porcelain body having a portion of its surface coated with a glaze, and a multiplicity of particles of ceramic material contained in said glaze, and held thereby to said body to provide a roughened surface, said glaze and said particles after firing having coefficients of thermal expansion lower than that of said body.

4. A porcelain body having a portion of its surface coated with an added ceramic coating, and a multiplicity of particles of ceramic material contained in said coating and held thereby to said body with portions of said particles projecting above said coating to provide a roughened surface, said particles after firing having a coefficient of thermal expansion lower than that of said body but sufficiently high to avoid the shivering of said particles from said body.

5. A body of feldspathic porcelain having a portion thereof coated with an added ceramic coating, and a multiplicity of particles of ceramic material contained in said coating and held thereby to said body to provide a roughened surface, said material containing cordierite, and said coating and said material after firing having coefficients of thermal expansion lower than that of said body.

6. A body of feldspathic porcelain having a portion thereof coated with an added ceramic coating and a multiplicity of particles of ceramic material contained in said coating and held thereby to said body to provide a roughened surface, said material containing beryl, and said coating and said material after firing having coefficients of thermal expansion lower than that of said body.

7. A body of ceramic material having a relatively low coefficient of thermal expansion and having a portion of its surface coated with an added ceramic coating, and a multiplicity of particles of fused quartz contained in said coating and held thereby to said body with portions of said particles projecting above said coating to provide a roughened surface, said coating and said fused quartz after firing having coefficients of thermal expansion lower than that of said body.

8. An electric insulator made of feldspathic porcelain and having an attaching surface coated with an added ceramic coating, and a multiplicity of particles of ceramic material contained in said coating and held thereby to said insulator with portions of said particles projecting above said coating to provide a roughened attaching surface, said coating and said material after firing having coefficients of thermal expansion lower than that of said insulator.

9. An electric insulator having an attaching surface coated with an added ceramic coating, and a multiplicity of particles of ceramic material contained in said coating and held thereby to said insulator with portions of said particles projecting above said coating to provide a roughened surface, said material being made from a porcelain mix having a substantial proportion of talc therein, said coating and said material after firing having coefficients of thermal expansion lower than that of said insulator.

10. A porcelain body having a portion of its surface coated with an added ceramic coating, and a multiplicity of particles of ceramic material contained in said coating and held thereby to said body with portions of said particles projecting above said coating to provide a roughened surface, said particles after firing having a coefficient of thermal expansion lower than that of said body by an amount within the range from about 0.0000001 to 0.0000007 per degree Fahrenheit.

11. A porcelain body having a portion of its surface coated with an added ceramic coating, and a multiplicity of particles of ceramic material contained in said coating and held thereby to said body with portions of said particles projecting above said coating to provide a roughened surface, said particles after firing having a coefficient of thermal expansion lower than that of said body by about 0.0000004 per degree Fahrenheit.

12. A porcelain body having a portion of its surface coated with an added ceramic coating, said coating having a coefficient of thermal expansion lower than that of said body, and a multiplicity of particles of ceramic material contained in said coating and held thereby to said body with portions of said particles projecting above said coating to provide a roughened surface, said particles after firing having a coefficient of thermal expansion lower than that of said body by an amount within the range from about 0.0000001 to 0.0000007 per degree Fahrenheit.

KENNETH E. STETTINIUS.
BENJAMIN F. DEWEY.